United States Patent [19]
Lee

[11] Patent Number: 5,923,841
[45] Date of Patent: Jul. 13, 1999

[54] COMPUTER SYSTEM HAVING SECURITY FUNCTIONS AND A SECURITY METHOD

[75] Inventor: Sang-Jin Lee, Suwon, Rep. of Korea

[73] Assignee: SamSung Electronics Co., Ltd., Suwon, Rep. of Korea

[21] Appl. No.: 08/732,148

[22] Filed: Oct. 16, 1996

[30] Foreign Application Priority Data

Oct. 18, 1995 [KR] Rep. of Korea ................... 95-36000

[51] Int. Cl.$^6$ .................................................. G06F 11/00
[52] U.S. Cl. ............................................... 395/188.01
[58] Field of Search .......................... 395/186, 187.01, 395/188.01, 490, 491, 609; 380/3, 4, 23, 25

[56] References Cited

U.S. PATENT DOCUMENTS

| | | | |
|---|---|---|---|
| 5,202,997 | 4/1993 | Arato | 395/186 |
| 5,313,639 | 5/1994 | Chao | 395/188.01 |
| 5,375,243 | 12/1994 | Parzych et al. | 395/188.01 |
| 5,414,844 | 5/1995 | Wang | 395/650 |
| 5,465,341 | 11/1995 | Doi et al. | 395/183.06 |
| 5,469,564 | 11/1995 | Junya | 395/188.01 |
| 5,483,649 | 1/1996 | Kuznetsov et al. | 395/186 |
| 5,537,544 | 7/1996 | Morisawa et al. | 395/188.01 |
| 5,542,044 | 7/1996 | Pope | 395/186 |
| 5,591,200 | 1/1997 | Cone et al. | 606/201 |
| 5,742,683 | 4/1998 | Lee et al. | 380/23 |

Primary Examiner—Robert W. Beausoliel, Jr.
Assistant Examiner—Scott T. Baderman
Attorney, Agent, or Firm—Robert E. Bushnell, Esq.

[57] ABSTRACT

A computer system having security functions according to an exemplary embodiment of the present invention includes a keyboard for enabling a user to select a user mode from a plurality of user modes, and input a password corresponding to the selected user mode. Each one of the user modes has a unique password. A central processing unit determines whether the password corresponding to the selected user mode is correctly input by the user, and outputs a mode signal indicative of the selected user mode when the password corresponding to the selected user mode is correctly input by the user. The central processing unit further outputs first and second control signals to control the computer system. A disk drive controller controls a disk drive according to the first control signal output from the central processing unit. An output device controller controls an output device according to the second control signal output from the central processing unit. A controller restricts operations of the disk drive controller and the output device controller according to the mode signal when the first and second control signals are respectively input to the disk drive controller and the output device controller.

17 Claims, 5 Drawing Sheets

COMPUTER SYSTEM HAVING SECURITY FUNCTIONS AND A SECURITY METHOD

CROSS-REFERENCE TO RELATED APPLICATIONS

This application makes reference to, incorporates the same herein, and claims all benefits accruing under 35 U.S.C. §119 arising from an application for Computer System Having Security Functions And A Security Method earlier filed in the Korean Industrial Property Office on Oct. 18, 1995 and there duly assigned Ser. No. 36000/1995.

BACKGROUND OF THE INVENTION

The present invention relates to security functions for a computer system, and more particularly, to a computer system having security functions which allow only an authorized user to copy information on diskettes and other such memory media, and to output information by printing.

There is an expanding trend toward the use of computer systems. Nowadays, the vast majority of companies, institutions, and governments use computer systems, at least in some capacity. Since many business affairs are handled using computers, there is often a need to store general, and even confidential, documents in the memory of the computer.

In regards to the handling of such confidential information, it is only natural that companies, government agencies, and other institutions would want to protect this information that exists in their computer(s). Generally, computer systems in various institutions are not used by a single person, but rather, are shared by a number of people. Because of this, an unauthorized person can easily copy on a diskette or print out important, confidential information. Accordingly, there exists a need to provide the general computer system with security features that restrict access to confidential information.

One prior art reference directed toward this concept is U.S. Pat. No. 5,375,243 entitled Hard Disk Password Security System issued to Parzych et al. In Parzych et al. '243, data access operations on a hard disk drive are prevented until a user enters a password. When the user enters the correct password, the hard disk drive unlocks and operates as a conventional disk drive. While this type of conventional art is beneficial in its own right, I note that it fails to restrict access to a printing device connected to the computer. Moreover, it fails to provide a security function that enables the performance of different selected user modes in response to input of different corresponding passwords.

SUMMARY OF THE INVENTION

It is an object of the present invention to provide a computer system having improved security functions.

It is another object to provide a computer system having security functions that prohibit the use of a disk drive and a printer based on a selected user mode.

It is still another object to provide a computer system having security functions that are implemented based on a selected user mode, in which the selected user mode has a unique corresponding password.

It is yet another object to provide a security method for a computer system that restricts the use of a disk drive and a printer based on a selected user mode having a unique corresponding password.

To achieve these and other objects, an exemplary embodiment of the present invention provides a computer system having a keyboard for enabling a user to select a user mode from a plurality of user modes, and to input a password corresponding to the selected user mode. Each one of the user modes has a unique password. A central processing unit determines whether the password corresponding to the selected user mode is correctly input by the user, and outputs a mode signal indicative of the selected user mode when the password corresponding to the selected user mode is correctly input by the user. The central processing unit further outputs first and second control signals to control the computer system. A disk drive controller controls a disk drive according to the first control signal output from the central processing unit. An output device controller controls an output device according to the second control signal output from the central processing unit. A controller restricts operations of the disk drive controller and the output device controller according to the mode signal when the first and second control signals are input to the disk drive controller and the output device controller, respectively.

The present invention further provides a method for controlling a computer system having security functions. The method enables a user to select a user mode from a plurality of user modes. The user is also enabled to input a password corresponding to the user mode selected by the user, each one of the user modes having a unique password. The method then determines whether the password corresponding to the user mode is correctly input and denies the user access to the computer system when the password corresponding to the user mode is incorrectly input. In accordance with the method, the computer system is set to the user mode selected by the user when the password corresponding to the user mode is correctly input and an operating system of the computer system is loaded into a memory. Application programs are then run, and use of a disk drive and a printing device of the computer system are restricted according to the user mode selected by the user.

Another embodiment of the present invention provides a computer system having a keyboard for enabling a user to select a user mode from a plurality of user modes, and input a password corresponding to the selected user mode. Each one of the user modes has a unique password. A central processing unit determines whether the password corresponding to the selected user mode is correctly input by the user, and outputs a mode signal indicative of the selected user mode when the password corresponding to the selected user mode is correctly input by the user. The central processing unit further outputs first and second control signals to control the computer system. A disk drive controller controls a disk drive according to the first control signal output from the central processing unit. An output device controller controls an output device according to the second control signal output from the central processing unit. A logic section restricts operations of the disk drive controller and the output device controller according to the mode signal when the first and second control signals are provided to the disk drive controller and the output device controller, respectively.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
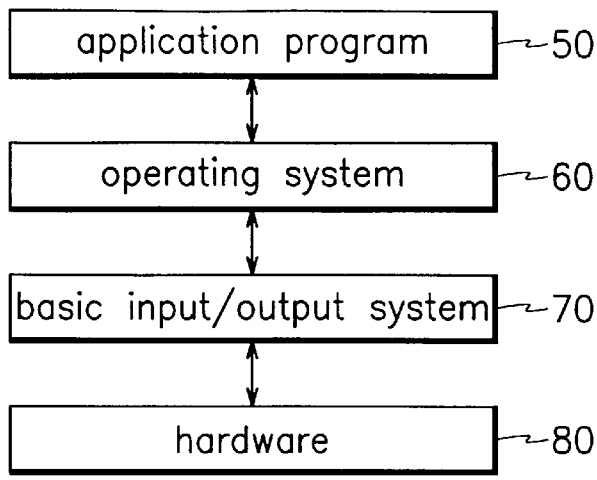
FIG. 1 is a hierarchical interface block diagram of a general computer system.

Turning now to the drawings and referring to FIG. 1, a hierarchical interface block diagram of a general computer system is shown. In FIG. 1, the hierarchical interface structure of a general computer system includes an application program 50, which is a program that a computer user utilizes to perform his or her work. An operating system (O/S) 60 is software which controls the execution of computer programs, and controls the general operation of the computer system. In particular, the operating system (O/S) 60 is software which controls and handles all of the programs executed in all portions of the computer, and offers various services including scheduling, de-bugging input/output control, compiling, memory distribution, and data management. Hardware 80 includes the circuitry and electronics of the computer system that make up the structure of a data processing system. A basic input/output system (BIOS) 70 is software that includes programs which directly operate the hardware 80. The basic input/output system (BIOS) 70 allows the application program 50 and operating system (O/S) 60 to be unrelated, and to act independently from the hardware 80. The application program 50 controls the operation of hardware 80 through the operating system (O/S) 60 and the basic input/output system (BIOS) 70 in a hierarchical manner. Depending on the situation, there are times when the application program 50 goes directly to the hardware 80 for control and operation without first going through operating system (O/S) 60 or the basic input/output system (BIOS) 70.

Figure 2:
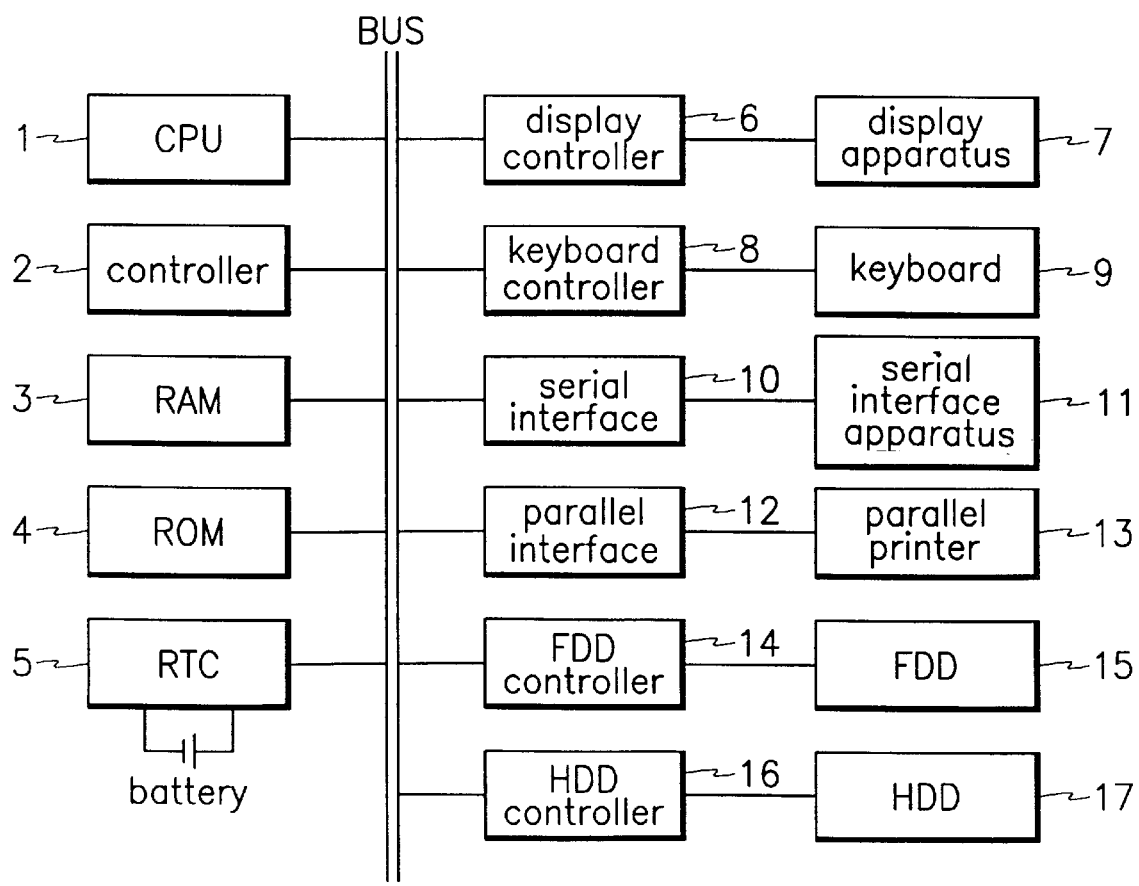
FIG. 2 is a block circuit diagram of a general computer system.

FIG. 2 is a block circuit diagram of a general computer system. The computer system of FIG. 2 includes a central processing unit (CPU) 1 that executes, calculates, and handles programs. A controller 2 includes a direct memory access (DMA) controller, a bus controller, an interrupt controller, and other auxiliary controllers. A random access memory (RAM) 3 is a memory that enables operation of the loaded system and user software. A read only memory (ROM) 4 stores programs that initialize the computer, runs self-tests when the computer is turned on, and also runs programs in charge of hardware and software interface. A real-time clock (RTC) 5, which has a separate processor that independently calculates time, includes registers for storing information related to the structure of the system using a non-volatile memory (i.e., EEPROM, flash memory, etc.). Since real-time clock (RTC) 5 is a timer module having a separate battery, it can record time delay effects and the present time of the computer system. A display apparatus 7 exhibits the present operating state of the computer, and is controlled by a display controller 6. A keyboard 9 provides external user inputs to the computer system, and is controlled by a keyboard controller 8. A serial interface 10 provides serial communications to serial interface apparatus 11, which may include an external modem (i.e., communication device), serial printer, etc. A parallel interface 12 provides parallel communications to a parallel printer 13. A floppy disk drive (FDD) 15 is an auxiliary memory unit that uses diskettes, and is controlled by a floppy disk drive (FDD) controller 14. A hard disk drive (HDD) 17 is an auxiliary memory unit, and is controlled by a hard disk drive (HDD) controller 16.

Figure 3:
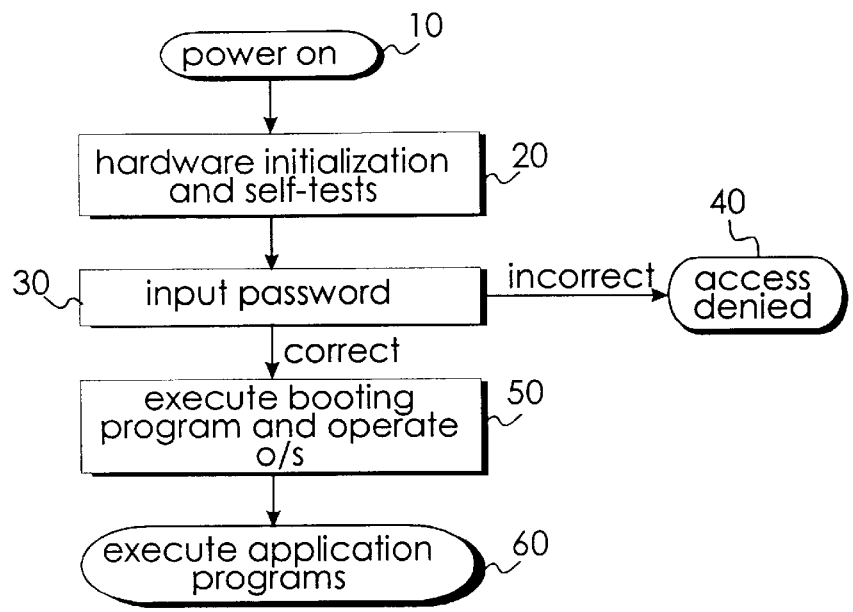
FIG. 3 is a flow chart of a booting operation of the computer system of FIG. 2.

FIG. 3 is a flow chart of a booting operation of the computer system of FIG. 2. According to the flow chart of FIG. 3, electrical power is turned on and applied to the computer system in step 10. Then, in step 20, the hardware is initialized and self-tests are performed. In step 30, a password is input by a user. In step 50, a booting program is executed and the operating system is operated. Finally, in step 60, application programs are executed.

A more detailed description of the flow chart of FIG. 3 will now be provided.

Once electrical power is turned on and applied to the computer system in step 10, a power on self-test (POST) is run in the basic input/output system (BIOS) stored in read only memory (ROM) 4, and the hardware goes through an initializing process and runs a self-test on each of its parts, in step 20. After the self-tests are performed, a user is requested to enter a password which is input in step 30. Next, a determination is made to see whether the password input by the user matches the password stored in a register of the real-time clock (RTC) 5. If a match occurs (i.e., the password is correctly input) the normal booting process is executed in step 50. Alternatively, if there is no match (i.e., the password is incorrectly input), the booting process is not executed and further access is denied in step 40. A password algorithm can be used to confirm the validity of the input password, and password information can alternatively be stored in the non-volatile memory of the real-time clock (RTC) 5. There are also computer systems that do not require a password for access.

If the user inputs the correct password, a process is initiated whereby an operating system that exists in a special location of an auxiliary memory unit, such as the hard disk drive (HDD) 17 or the floppy disk drive (FDD) 15, is loaded into the random access memory (RAM) 3, in step 50. Then, the computer system changes to a state that allows the user to execute application programs, in step 60.

In the computer system operating according to the flow chart of FIG. 3, input of a password is required only at an initial stage when the computer system is first turned on. In these cases, if the computer system is used by a number of people, after an authorized person has been given access and logged on by inputting the correct password, it would be quite easy for non-authorized persons to copy and print out information.

Figure 4:
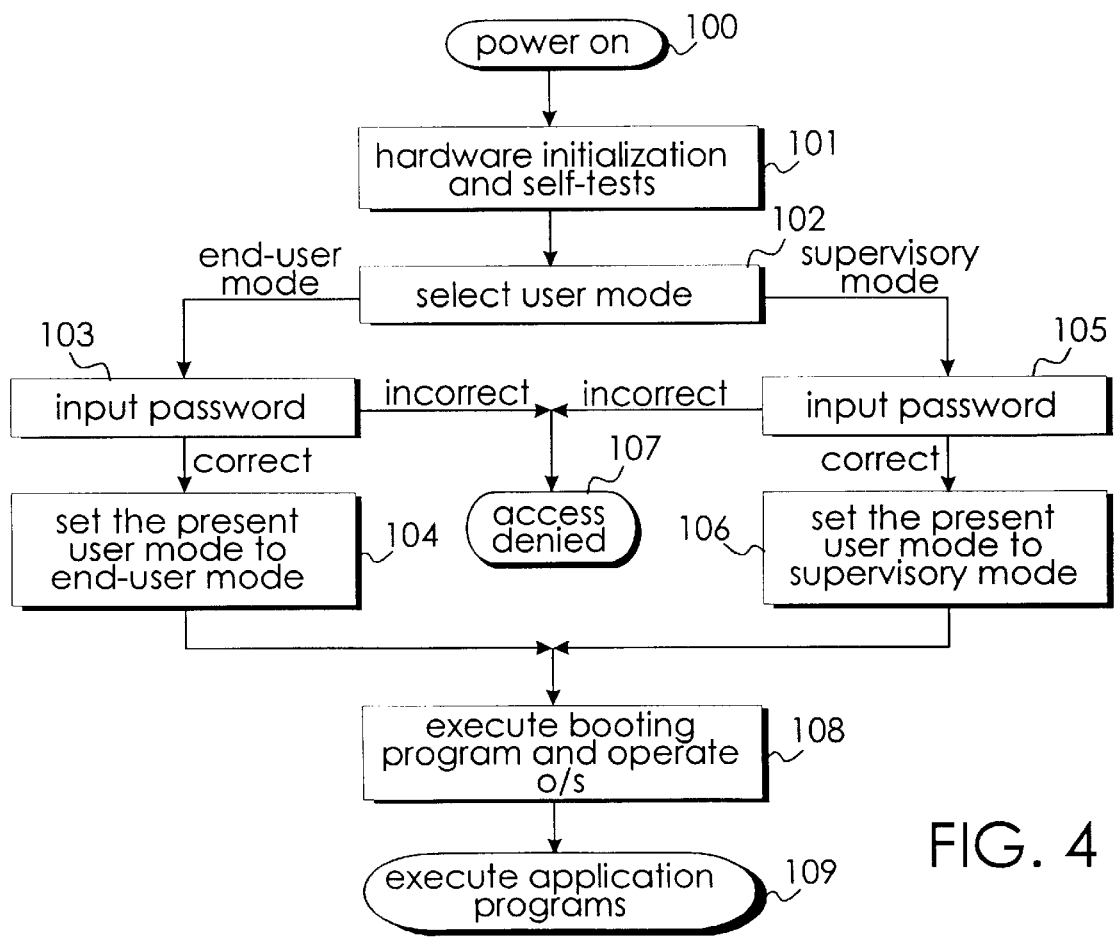
FIG. 4 is an operational flow chart of a computer system having security functions in accordance with a first embodiment of the present invention.

Referring now to FIG. 4, an operational flow chart of a computer system having security functions in accordance with a first embodiment of the present invention is shown. These security functions can be implemented in a computer system having a structure similar to the computer system shown in FIG. 2.

In FIG. 4, electrical power is turned on and applied to the computer system in step 100. In step 101, the hardware is initialized and self-tests are performed. Next, in step 102, a user selects an applicable user mode. If the user sets the computer to an end-user mode, the user inputs a password corresponding to the end-user mode in step 103. On the other hand, if the user sets the computer to a supervisory mode, the user inputs a password corresponding to the supervisory mode in step 105. In steps 103 and 105, when either of the respective passwords are incorrectly input, step 107 is performed and access is denied. Alternatively, when the password corresponding to the end-user mode is correctly input in step 103, the present user mode is set to the end-user mode in step 104. Similarly, when the password corresponding to the supervisory mode is correctly input in step 105, the present user mode is set to the supervisory mode in step 106. After step 104 or 106 is performed, a booting program is executed and the operating system (O/S) is operated in step 108. Then, application programs can be executed in step 109.

Figure 5:
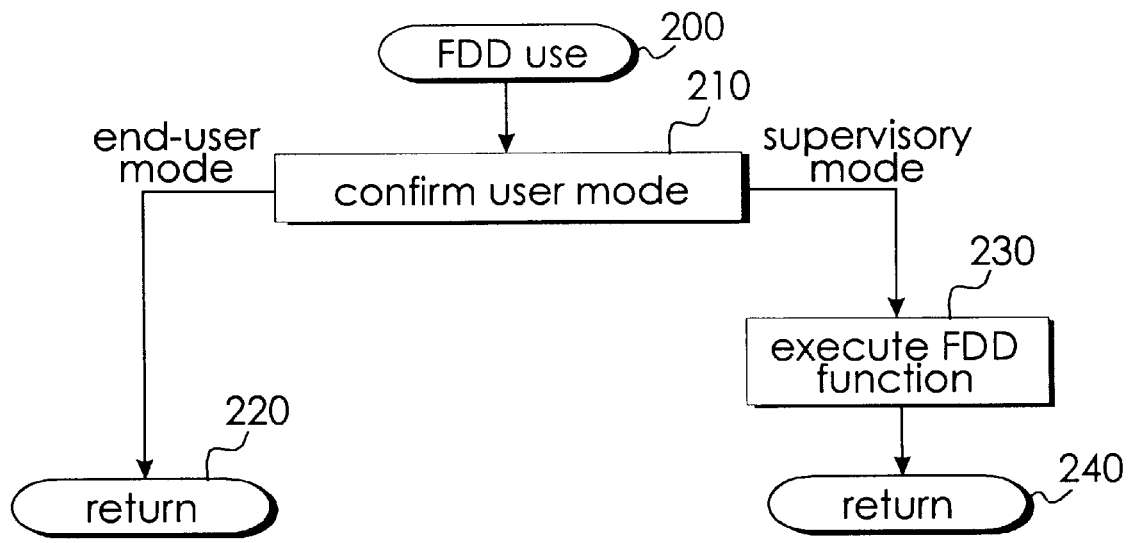
FIG. 5 is a flow chart illustrating a software security method related to a floppy disk drive (FDD) of a computer system having security functions in accordance with the first embodiment of the present invention.

FIG. 5 is a flow chart illustrating a software security method related to a floppy disk drive (FDD) of a computer system having security functions in accordance with the first embodiment of the present invention. As shown in FIG. 5, a floppy disk drive (FDD) use function is called in step 200. Then, in step 210, the present user mode is confirmed. When the present user mode is the end-user mode, use of the floppy disk drive (FDD) is not permitted and a return function is performed in step 220. Alternatively, when the present user mode is the supervisory mode, a floppy disk drive (FDD) function is executed in step 230. Then, the return function is performed in step 240.

Figure 6:
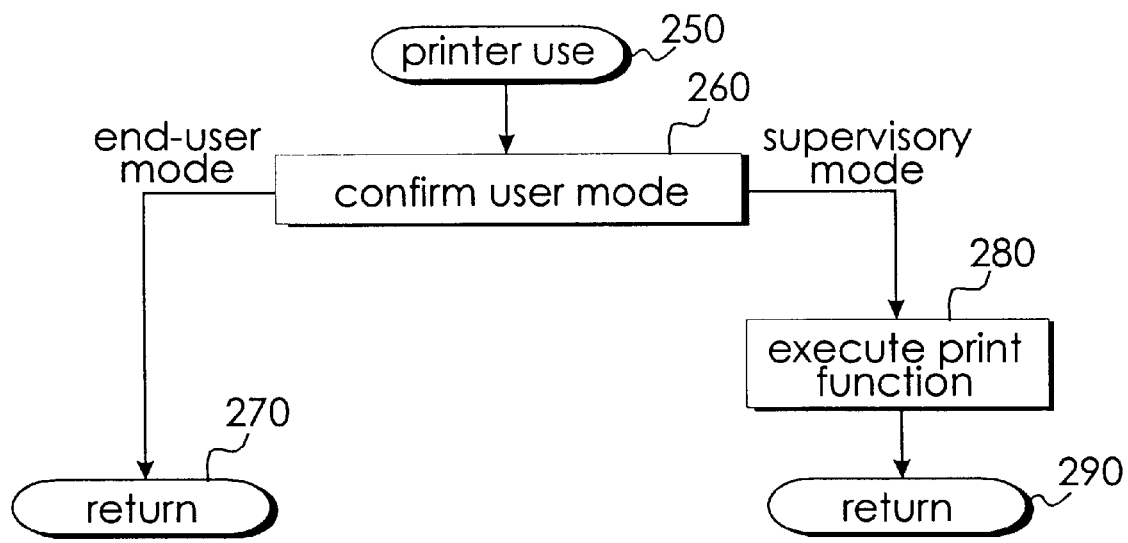
FIG. 6 is a flow chart illustrating a software security method related to a printer of a computer system having security functions in accordance with the first embodiment of the present invention.

FIG. 6 is a flow chart illustrating a software security method related to a printer of a computer system having security functions in accordance with the first embodiment of the present invention. As shown in FIG. 6, a printer use function is called in step 250. Then, in step 260, the present user mode is confirmed. When the present user mode is the end-user mode, use of the printer is not permitted and a return function is performed in step 270. Alternatively, when the present user mode is the supervisory mode, a print function is executed in step 280. Then, the return function is performed in step 290.

A more detailed description of the first embodiment of the present invention will now be provided with reference to FIGS. 4 through 6.

Figure 9:
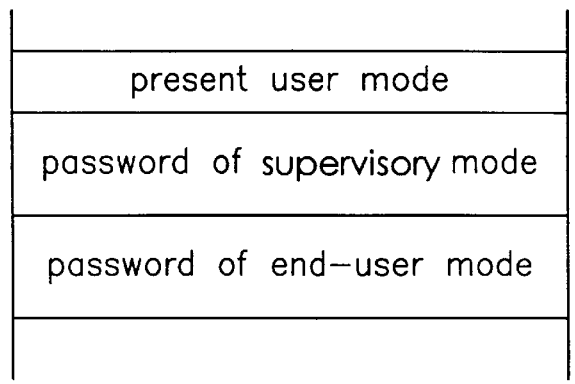
FIG. 9 is a memory map illustrating set-up information used in accordance with the first and second embodiments of the present invention.

When electrical power is turned on and applied to the computer system in step 100, operation of the computer system having security functions according to the first embodiment of the present invention begins. After the computer system begins operation, the hardware goes through an initializing process and runs self-tests in step 101. Then, the user is asked what mode he or she wants to run the computer in, and the user selects and inputs the desired user mode in step 102. The user mode selection can be made by the user through the use of a menu, or it can be done by the user inputting his or her name which automatically places the computer in a pre-determined user mode. If the latter is done, the user's name must be stored beforehand in the memory map depicted in FIG. 9.

When the user sets the computer to the end-user mode in step 102, the user is asked to input the password corresponding to the end-user mode in step 103. On the other hand, when the user sets the computer to the supervisory mode in step 102, the user inputs a password corresponding to the supervisory mode in step 105. In steps 103 and 105, when either of the respective passwords are incorrectly input, step 107 is performed and access is denied. Alternatively, when the password corresponding to the end-user mode is correctly input in step 103, the present user mode is set to the end-user mode in step 104. Similarly, when the password corresponding to the supervisory mode is correctly input in step 105, the present user mode is set to the supervisory mode in step 106. After step 104 or 106 is performed, a booting program is executed and the operating system (O/S) is operated in step 108. Then, application programs can be executed in step 109. During the execution of any application program, various functions can be called up in response to user inputs.

The process that occurs when floppy disk drive (FDD) and print functions are called will now be examined with reference to FIGS. 5 and 6.

Referring to FIG. 5, when a floppy disk drive (FDD) function is called to initiate use of the floppy disk drive (FDD) in step 200, the user mode is confirmed by the computer in step 210. When the computer is set to the end-user mode, use of the floppy disk drive (FDD) is prohibited, and the computer simply performs a return function in step 220. Alternatively, when the computer is set to the supervisory mode, use of the floppy disk drive (FDD) is allowed, and the floppy disk drive (FDD) function is executed in step 230. Thereafter, the computer performs the return function in step 240.

Referring now to FIG. 6, when a print function is called to initiate use of the printer in step 250, the user mode is confirmed by the computer in step 260. When the computer is set to the end-user mode, use of the printer is prohibited, and the computer simply performs the return function in step 270. Alternatively, when the computer is set to the supervisory mode, use of the printer is allowed, and the print function is executed in step 280. Thereafter, the computer performs the return function in step 290.

Figure 7:
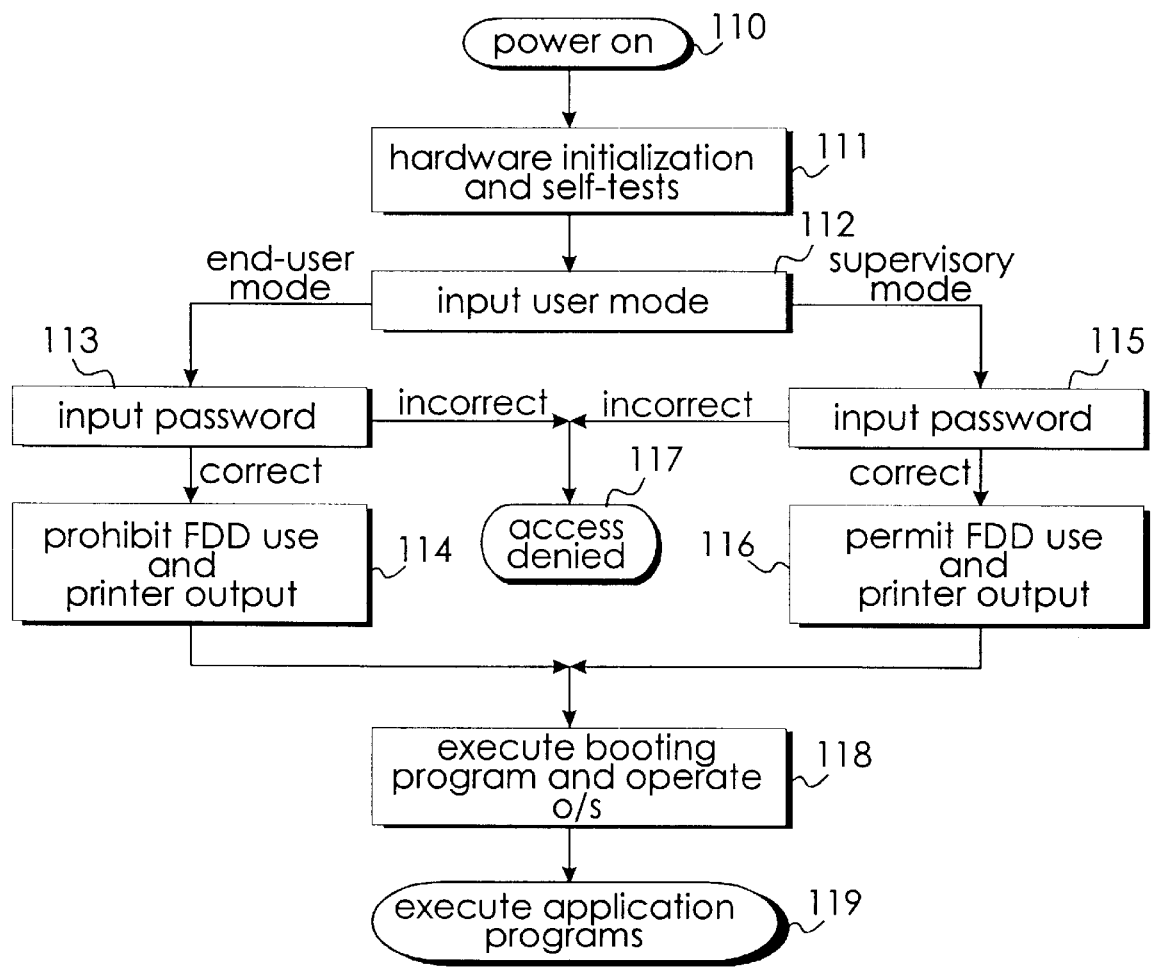
FIG. 7 is an operational flow chart of a computer system having security functions in accordance with a second embodiment of the present invention.

FIG. 7 is an operational flow chart of a computer system having security functions in accordance with the second embodiment of the present invention.

In FIG. 7, electrical power is turned on and applied to the computer system in step 110. In step 111, the hardware is initialized and self-tests are performed. Next, in step 112, a user selects an applicable user mode. If the user sets the computer to an end-user mode, the user inputs a password corresponding to the end-user mode in step 113. On the other hand, if the user sets the computer to a supervisory mode, the user inputs a password corresponding to the supervisory mode in step 115. In steps 113 and 115, when either of the respective passwords are incorrectly input, step 117 is performed and access is denied. Alternatively, when the password corresponding to the end-user mode is correctly input in step 113, the computer system prohibits use of the floppy disk drive (FDD) and further prohibits printer outputs in step 114. Similarly, when the password corresponding to the supervisory mode is correctly input in step 105, the computer system permits use of the floppy disk drive (FDD) and further permits printer outputs in step 116. After step 114 or 116 is performed, a booting program is executed and the operating system (O/S) is operated in step 118. Then, application programs can be executed in step 119.

Figure 8:
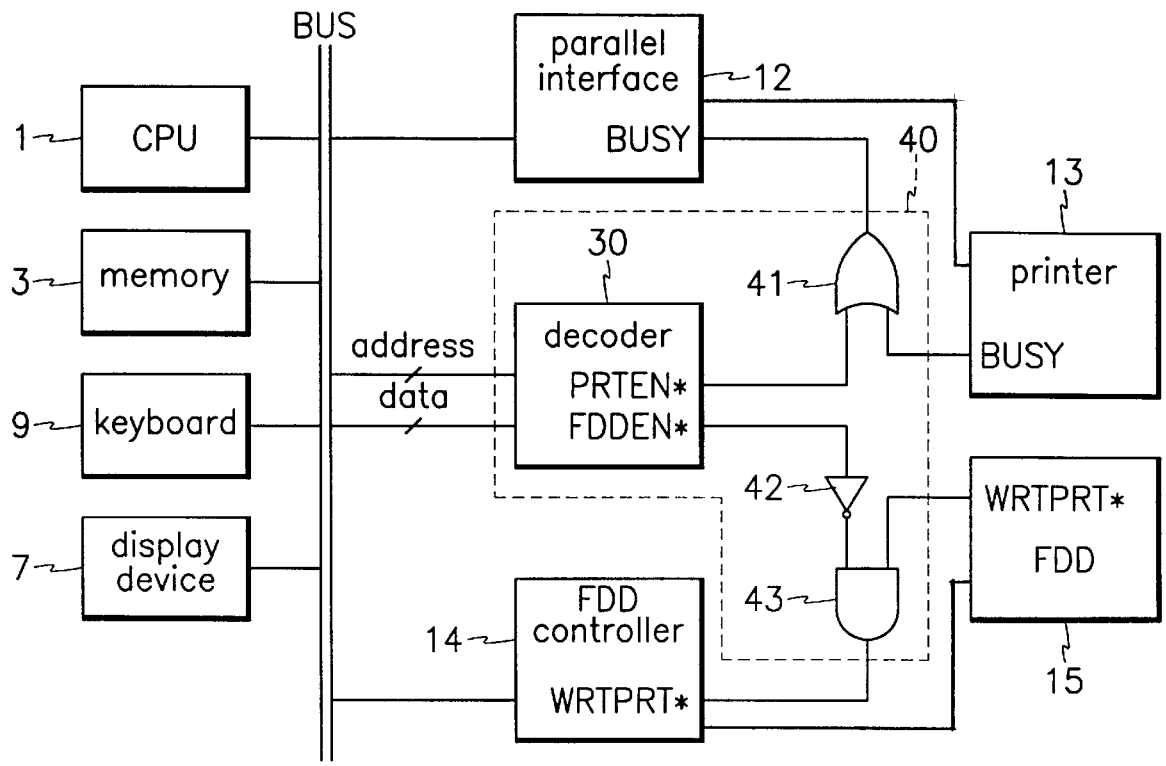
FIG. 8 is a diagram of a hardware security apparatus of a computer system having security functions in accordance with the second embodiment of the present invention.

FIG. 8 is a diagram of a hardware security apparatus of a computer system having security functions in accordance with the second embodiment of the present invention.

In FIG. 8, a keyboard 9 is provided to enable the user to input a selected mode and a password corresponding to the selected mode. A central processing unit (CPU) 1 receives the user inputs representative of the user mode and password input by the user, and makes comparisons with data that is stored in a memory 3. A display device 7 provides visual displays based on the operating state of the computer system. A floppy disk drive (FDD) controller 14 controls a floppy disk drive (FDD) 15 according to a control signal output from central processing unit (CPU) 1. A printer 13 is an output device capable of successively recording character data upon a printable medium. A parallel interface 12 connects the printer 13 with the computer to provide parallel communications therebetween, and controls printer 13 according to another control signal output from central processing unit (CPU) 1. Floppy disk drive 15 is an auxiliary memory unit for recording data on floppy disks, or reading recorded data from floppy disks. An arithmetic and logic section 40 is operated by the central processing unit (CPU) 1, and selectively prevents and permits the use of the floppy disk drive (FDD) 15 and other auxiliary memory units and of output devices, such as the printer 13.

Arithmetic and logic section 40 includes an OR gate 41 which is connected to receive a PRTEN* signal from a decoder 30 and a BUSY signal from the printer 13. OR gate 41 outputs a BUSY signal to parallel interface 12. A NOT gate 42 is connected to receive a FDDEN* signal from decoder 30. An AND gate 43 is connected to receive an output from NOT gate 42 and a WRTPRT* signal from the floppy disk drive (FDD) 15. AND gate 43 outputs a WRT-PRT* signal to floppy disk drive (FDD) controller 14.

A more detailed description of the second embodiment of the present invention will now be provided with reference to FIGS. 7 and 8.

When electrical power is turned on and applied to the computer system in step 110, operation of the computer system having security functions according to the second embodiment of the present invention begins. After the computer system begins operation, the hardware goes through an initializing process and runs self-tests in step 111. Then, the user is asked what mode he or she wants to run the computer in, and the user selects and inputs the desired user mode in step 112. The user mode selection can be made by the user through the use of a menu, or it can be done by the user inputting his or her name which automatically places the computer in a pre-determined user mode. If the latter is done, the user's name must be stored beforehand in the memory map depicted in FIG. 9.

When the user sets the computer to the end-user mode in step 112, the user is asked to input the password corresponding to the end-user mode in step 113. On the other hand, when the user sets the computer to the supervisory mode in step 112, the user inputs a password corresponding to the supervisory mode in step 115. In steps 113 and 115, when either of the respective passwords are incorrectly input, step 117 is performed and access is denied.

When the user mode selected in step 112 is the supervisory mode, an order is given to a specific input/output address so that the PRTEN* and FDDEN* signals are output from decoder 30 in a LOW logic state.

(Example)
mov dx, DECODER$_{13}$ ADDR;
out dx, PRT$_{13}$ FDD_ENABLE;
This program inputs an address value to a dx register, and outputs data for permitting the operation of the printer 13 and floppy disk drive (FDD) 15 in step 116. In the program, decoder signals PRTEN* and FDDEN* are always output in a LOW logic state, and according to the BUSY signal output from the printer 13, the BUSY signal received by parallel interface 12 exhibits a HIGH or LOW logic state. Floppy disk drive (FDD) controller 15 receives the WRTPRT* signal in either a HIGH or LOW logic state in dependence upon the logic state of the WRTPRT* (write prevent) signal output from the floppy disk drive (FDD) 15.

When the user mode selected in step 112 is the end-user mode, an order is given to a specific input/output address so that the PRTEN* and FDDEN* signals are output from decoder 30 in a HIGH logic state.

(Example)
mov dx, DECODER$_{13}$ ADD;
mov dx, PRT_FDD_DISABLE;
This program inputs an address value to a dx register, and outputs data for prohibiting the operation of the printer 13 and floppy disk drive (FDD) 15 in step 114. In the program, decoder signals PRTEN* and FDDEN* are always output in a HIGH logic state, and the BUSY signal received by parallel interface 12 always exhibits a HIGH logic state irrespective of the BUSY signal output from the printer 13. Floppy disk drive (FDD) controller 14 receives the WRT-PRT* signal in a LOW logic state irrespective of the logic state of the WRTPRT* (write prevent) signal output from the floppy disk drive (FDD) 15. In FIG. 8, decoder 30 has a LATCH function which enables the decoder 30 to maintain outputs in a LOW or HIGH logic state according to the initial output state of the PRTEN* and FDDEN* signals.

After step 114 or 116 is performed to either prohibit or permit the use of floppy disk drive (FDD) 15 and printer 13, a booting program is executed and the operating system (O/S) is operated in step 118. Then, application programs can be executed in step 119.

In FIG. 7, when going through the process using hardware, information regarding the present user mode and the additional steps of FIGS. 5 and 6 are not needed.

After a password for a given user mode is correctly input, a password set-up method can be performed so that the user can change or modify the present password for that user mode. The passwords shown in FIG. 9 can be designated and changed according to a specific algorithm.

In addition, the present invention can be expanded so that the end-user mode is divided into several sub-modes. For example, the following designations can be used.

*supervisory mode: full use authority granted,
*end-user mode 1: write function using floppy disk drive (FDD) allowed, printer output not allowed,
*end-user mode 2: write function using floppy disk drive (FDD) not allowed, printer output allowed, or
*end-user mode 3: write function using floppy disk drive (FDD) and printer output not allowed.

Accordingly, if the mode designations are expanded, as exemplified above, the present invention can also be applied to cartridge tape drives, metal tape drives and other such auxiliary memory units, in addition to floppy disk drives (FDDs) and printers. Moveover, the present invention can also be made applicable to restrict the use of serial printers, plotters, communication devices, various output devices and network interface devices that allow external information transmission.

In the above preferred embodiment of the present invention using the software actualization method, as is shown in the hierarchical interface of FIG. 1, a specific application program does not go through the operating system or the basic input/output system (BIOS) to operate the floppy disk drive (FDD) and printer. If the hardware is directly controlled, so that the effects of the present invention can not be seen, most application programs go through the operating system or the basic input/output system (BIOS) to realize floppy disk drive (FDD) write and printer output operations.

The advantage of the software actualization method is that the effects of the present invention can be seen without major modifications to the hardware, but only by adjusting a read only memory (ROM). When using a computer system realized through the above method in government or business offices, only authorized persons can print information and perform a write operation with the floppy disk drive (FDD).

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A computer system, comprising:
    a keyboard for enabling a user to select and input a mode from a plurality of modes, and to input a password selected by the user, said password corresponding to a respective one of a user mode and a supervisory mode;
    a central processing unit for determining whether said password is correctly input by the user and whether said password input by the user corresponds correctly to the mode selected by the user, and for outputting a mode signal indicative of said mode selected by the user when said password is correctly input by the user and corresponds correctly to the mode selected by the user, said central processing unit further outputting first and second control signals to control said computer system only if a predetermined mode signal is output;
    a disk drive controller for controlling a disk drive according to said first control signal output from said central processing unit;
    a printing device controller for controlling a printing device according to said second control signal output from said central processing unit; and
    a controller for restricting operations of said disk drive controller and said printing device controller when said mode signal output by said central processing unit is not said predetermined mode signal.

2. The computer system as claimed in claim 1, wherein said disk drive comprises a floppy disk drive.

3. The computer system as claimed in claim 1, further comprising a network interface device and a communication device that are controlled by said central processing unit and whose operations are restricted by said controller according to said mode signal.

4. The computer system as claimed in claim 2, further comprising a network interface device and a communication device that are controlled by said central processing unit and whose operations are restricted by said controller according to said mode signal.

5. A method for controlling a computer system having security functions, comprising the steps of:
    enabling a user to select and input a mode from a plurality of modes including a user mode and a supervisory mode;
    enabling the user to input a password corresponding to said mode selected by the user, said password corresponding to a respective one of the user mode and the supervisory mode;
    determining whether said password is correctly input;
    denying user access to said computer system when said password is incorrectly input;
    setting said computer system to said mode selected by the user when said password input corresponds correctly to said mode selected by the user;
    loading an operating system of said computer system into a memory;
    running application programs; and
    preventing use of a disk drive and a printing device of said computer system when said user mode is selected by the user and when said password corresponding to said user mode is correctly input by the user.

6. The method as claimed in claim 5, further comprising the step of restricting use of a network interface device or a communication device according to said user mode.

7. A computer system, comprising:
    a keyboard for enabling a user to select and input a mode from a plurality of modes, and to input a password selected by the user, said password corresponding to a respective one of a user mode and a supervisory mode;
    a central processing unit for determining whether said password is correctly input by the user and whether said password input by the user corresponds correctly to the mode selected by the user, and for outputting a mode signal indicative of said mode selected by the user when said password is correctly input by the user and corresponds correctly to the mode selected by the user, said central processing unit further outputting first and second control signals to control said computer system only if a predetermined mode signal is output;
    a disk drive controller for controlling a disk drive according to said first control signal output from said central processing unit;
    a printing device controller for controlling a printing device according to said second control signal output from said central processing unit;
    a logic section preventing operations of said disk drive controller and said printing device controller when said mode signal output by said central processing unit is not said predetermined mode signal; and
    a network interface device and a communication device controlled by said central processing unit and having operation restricted by said logic section according to said mode signal.

8. The computer system as claimed in claim 7, wherein said disk drive comprises a floppy disk drive.

9. The computer system as claimed in claim 7, wherein said logic section comprises:
    a decoder for outputting a disk drive enable signal and a printing device enable signal according to said mode signal;
    an OR gate for logically combining said printing device enable signal provided from said decoder with a busy signal provided from said printing device, and providing a first output for controlling an operating state of said printing device controller;

a NOT gate for receiving said disk drive enable signal from said decoder, and inverting a logic state of said disk drive enable signal to generate an inverted signal; and an AND gate for logically combining said inverted signal with a write signal provided from said disk drive, and providing a second output for controlling an operating state of said disk drive controller.

10. A computer system, comprising:

a keyboard for enabling a user to select a user mode from a plurality of user modes, and input a password corresponding to said user mode selected by the user, each one of said user modes having a unique password;

a central processing unit for determining whether said password corresponding to said user mode is correctly input by the user, and outputting a mode signal indicative of said user mode selected by the user when said password corresponding to said user mode is correctly input by the user, said central processing unit further outputting first and second control signals to control said computer system;

a disk drive controller for controlling a disk drive according to said first control signal output from said central processing unit;

a printing device controller for controlling a printing device according to said second control signal output from said central processing unit; and a logic section for restricting operations of said disk drive controller and said printing device controller according to said mode signal when said first and second control signals are respectively provided to said disk drive controller and said printing device controller, wherein said logic section comprises:

a decoder for outputting a disk drive enable signal and a printing device enable signal according to said mode signal;

an OR gate for logically combining said printing device enable signal provided from said decoder with a busy signal provided from said printing device, and providing a first output for controlling an operating state of said printing device controller;

a NOT gate for receiving said disk drive enable signal from said decoder, and inverting a logic state of said disk drive enable signal to generate an inverted signal; and an AND gate for logically combining said inverted signal with a write signal provided from said disk drive, and providing a second output for controlling an operating state of said disk drive controller.

11. A method for controlling a computer system having security functions, comprising the steps of:

performing a hardware initialization and self-tests in response to an application of electrical power to said computer system;

enabling a user to select and input one of a first mode and a second mode after the performance of said hardware initialization and self-tests;

enabling the user to input a first password corresponding to said first mode when said first mode is selected by the user;

enabling the user to input a second password corresponding to said second mode when said second mode is selected by the user;

denying the user access to said computer system when either of said first and second passwords is incorrectly input by the user;

setting a present user mode of said computer system to said first mode when the user correctly inputs said first password;

setting said present user mode of said computer system to said second mode when the user correctly inputs said second password;

preventing the user from using a disk drive function and a printing function of said computer system when said present user mode corresponds to said first mode; and allowing the user to use said disk drive function and said printing function of said computer system when said present user mode corresponds to said second mode.

12. The method as claimed in claim 11, wherein said first mode comprises an end-user mode.

13. The method as claimed in claim 12, wherein said second mode comprises a supervisory mode.

14. The method as claimed in claim 11, wherein said second mode comprises a supervisory mode.

15. The method as claimed in claim 11, further comprising the step of preventing the user from using said printing function and allowing the user to use said disk drive function when said present user mode corresponds to a third mode.

16. The method as claimed in claim 15, further comprising the step of preventing the user from using said disk drive function and allowing the user to use said printing function when said present user mode corresponds to a fourth mode.

17. The method as claimed in claim 11, further comprising the step of preventing the user from using said disk drive function and allowing the user to use said printing function when said present user mode corresponds to a fourth mode.

* * * * *